(12) United States Patent
Suzuki et al.

(10) Patent No.: US 7,733,495 B2
(45) Date of Patent: Jun. 8, 2010

(54) OPTICAL MULTILAYER MIRROR AND FABRY-PEROT INTERFEROMETER HAVING THE SAME

(75) Inventors: Megumi Suzuki, Toyota (JP); Hiroyuki Wado, Toyota (JP); Takahiko Yoshida, Okazaki (JP)

(73) Assignee: DENSO CORPORATION, Kariya (JP)

( * ) Notice: Subject to any disclaimer, the term of this patent is extended or adjusted under 35 U.S.C. 154(b) by 77 days.

(21) Appl. No.: 11/907,002

(22) Filed: Oct. 9, 2007

(65) Prior Publication Data

US 2008/0123100 A1 May 29, 2008

(30) Foreign Application Priority Data

Nov. 28, 2006 (JP) ............................. 2006-319779

(51) Int. Cl.
*G01B 9/02* (2006.01)
(52) U.S. Cl. ...................................... 356/454; 356/519
(58) Field of Classification Search ................. 356/454, 356/519
See application file for complete search history.

(56) References Cited

U.S. PATENT DOCUMENTS

| 5,561,523 | A | 10/1996 | Blomberg et al. |
| 5,646,729 | A | 7/1997 | Koskinen et al. |
| 5,739,945 | A | 4/1998 | Tayebati |
| 5,835,216 | A | 11/1998 | Koskinen |
| 6,590,710 | B2 * | 7/2003 | Hara et al. .................. 356/519 |
| 6,927,387 | B2 * | 8/2005 | Viktorovitch et al. ....... 250/226 |
| 7,239,001 | B2 | 7/2007 | Pautet et al. |
| 2004/0169188 | A1 * | 9/2004 | Nunoue et al. ................. 257/98 |
| 2005/0018331 | A1 * | 1/2005 | Pautet et al. ................. 359/885 |

OTHER PUBLICATIONS

Office Action dated Jun. 5, 2009 from the China Patent Office in the corresponding application No. 200710193490.1 (and English Translation).
Office Action dated May 14, 2009 from the German Patent Office in the corresponding DE application No. 10 2007 051 537.7 (and English Translation).
Office Action dated May 27, 2009 from the Korea Patent Office in the corresponding KR application No. 10-2007-0121734 (and English Translation).

* cited by examiner

*Primary Examiner*—Samuel A Turner
(74) *Attorney, Agent, or Firm*—Posz Law Group, PLC

(57) ABSTRACT

An optical multilayer mirror of a Fabry-Perot interferometer includes a reinforcing section provided as a side wall of each of second and fourth high refractive-index layers. The reinforcing section is configured to support a portion of each of the second and fourth high refractive-index layers covering a top surface of each of first and second low refractive-index layers and reach first and third high refractive-index layers via each of the first and second low refractive-index layers, respectively. Even when the first and second low refractive-index layers lack a mechanical strength with a high n ratio achieved by selecting materials for the first through fourth high refractive-index layers and the first and second low refractive-index layers, the reinforcing section helps prevent the second and fourth high refractive-index layers from being bent. The optical multilayer mirror thus features a wide high-reflectance band.

24 Claims, 7 Drawing Sheets

OPTICAL MULTILAYER MIRROR AND FABRY-PEROT INTERFEROMETER HAVING THE SAME

CROSS REFERENCE TO RELATED APPLICATION

This application is based on and incorporates herein by reference Japanese Patent Application No. 2006-319779 filed on Nov. 28, 2006.

FIELD OF THE INVENTION

The present invention relates to an optical multilayer mirror featuring a wide high-reflectance band and a Fabry-Perot interferometer having the same.

BACKGROUND OF THE INVENTION

As a conventional technology, Patent Document 1 proposes the Fabry-Perot interferometer providing the high-reflectance mirror using the optical multilayer. The Fabry-Perot interferometer includes lower and upper mirrors that are arranged opposite to each other with an air gap between them. According to Patent Document 1, the lower mirror is formed by alternately layering a silicon dioxide layer and a Poly-Si layer on a substrate. The upper mirror is formed by alternately layering a silicon layer and a dioxide layer. The optical multilayer is used to configure the high-reflectance mirror.

Patent Document 1: JP-3457373

The optical multilayer, however, largely depends on the wavelength and narrows the mirror's high-reflectance band. The Fabry-Perot interferometer's spectroscopy band corresponds to the mirror's high-reflectance band. The Fabry-Perot interferometer using the mirror with a narrow high-reflectance band thereby narrows the spectroscopy band.

SUMMARY OF THE INVENTION

The present invention has been made in consideration of the foregoing. It is therefore an object of the present invention to provide an optical multilayer mirror featuring a wide high-reflectance band and a Fabry-Perot interferometer having the same.

To achieve the above object, as an example of the present invention, an optical multilayer mirror is provided as follows. The optical multilayer mirror includes a lower mirror and an upper mirror. The lower mirror is arranged over a substrate, while the upper mirror faces the lower mirror via a gap. The lower mirror includes: a first high refractive-index layer that is arranged over the substrate and features a first refractive index; a first low refractive-index layer that is arranged to face the first high refractive-index layer and features a second refractive index smaller than the first refractive index; a second high refractive-index layer that is arranged to cover the first low refractive-index layer; and a first reinforcing section that is configured to support a portion of the second high refractive-index layer covering a top surface of the first low refractive-index layer and reach the first high refractive-index layer via the first low refractive-index layer. The upper mirror includes: a third high refractive-index layer that is arranged over the substrate and features the first refractive index; a second low refractive-index layer that is arranged to face the third high refractive-index layer and features the second refractive index; a fourth high refractive-index layer that is arranged to cover the second low refractive-index layer; and a second reinforcing section that is configured to support a portion of the fourth high refractive-index layer covering a top surface of the second low refractive-index layer and reach the third high refractive-index layer via the second low refractive-index layer.

As another example of the present invention, a Fabry-Perot interferometer is provided as follows. The Fabry-Perot interferometer includes the above-mentioned optical multilayer mirror. The first and second high refractive-index layers are extended towards an outside of a region for the lower mirror. The third and fourth high refractive-index layers are extended towards an outside of a region for the upper mirror to provide a membrane. The fabry-perot interferometer further includes: a first electrode for applying a voltage to the second high refractive-index layer in the lower mirror; and a second electrode for applying a voltage to the fourth high refractive-index layer in the upper mirror. Here, an electrostatic attraction is generated based on potentials at the first and second electrodes to thereby vary an interval between the upper and lower mirrors.

As another example of the present invention, an optical multilayer mirror having a plurality of mirror units is provided as having at least one mirror. This optical multilayer mirror includes: a first high refractive-index layer that features a first refractive index; a low refractive-index layer that is arranged to face a portion of the first high refractive-index layer and features a second refractive index smaller than the first refractive index, the portion corresponding to the individual mirror units; a second high refractive-index layer that is arranged to cover the low refractive-index layer; and a reinforcing section that is configured to support a portion of the second high refractive-index layer covering a top surface of the low refractive-index layer and reach the first high refractive-index layer via the low refractive-index layer.

As yet another example of the present invention, an optical multilayer mirror is provided as follows. The optical multilayer mirror includes a lower mirror and an upper mirror. The lower mirror is arranged over a substrate, while the upper mirror faces the lower mirror via a gap. The lower mirror comprises: a first high refractive-index layer that is arranged over the substrate and features a first refractive index; a first air layer that is arranged to face the first high refractive-index layer and features a second refractive index smaller than the first refractive index; and a second high refractive-index layer that is arranged to cover the first air layer. The upper mirror comprises: a third high refractive-index layer that is arranged over the substrate and features the first refractive index; a second air layer that is arranged to face the third high refractive-index layer and features the second refractive index; and a fourth high refractive-index layer that is arranged to cover the second air layer.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
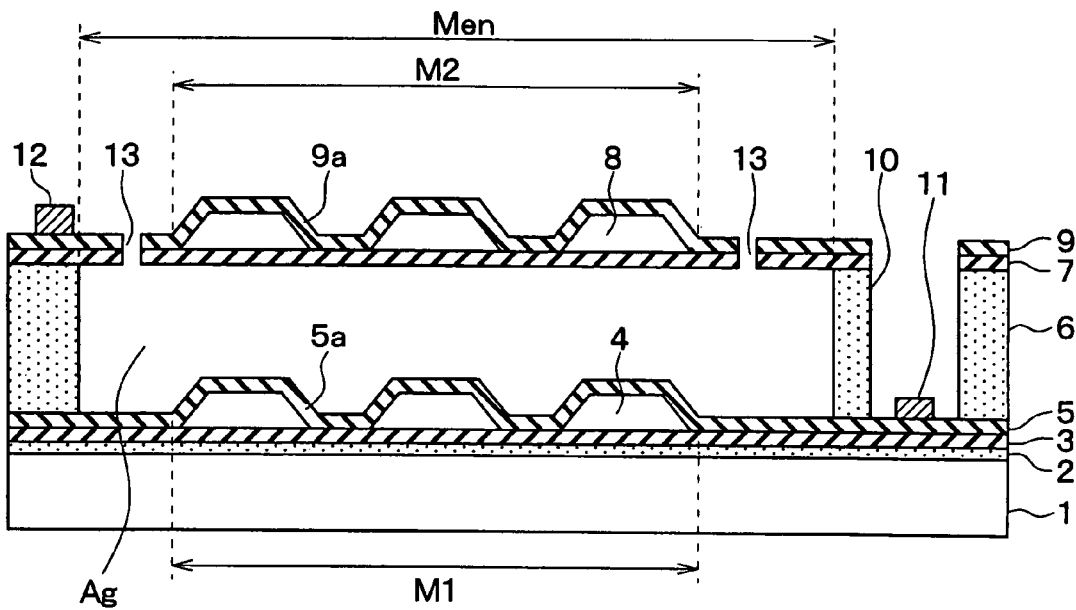
FIG. 1 is a sectional view of a Fabry-Perot interferometer having an optical multilayer mirror according to a first embodiment of the present invention.

Embodiments of the present invention will be described in further detail with reference to the accompanying drawings. Hereinafter, the mutually corresponding or equivalent parts in the following embodiments are designated by the same reference numerals.

First Embodiment

A first embodiment of the present invention will be described. FIG. 1 is a sectional view of a Fabry-Perot interferometer having an optical multilayer mirror according to the first embodiment with reference to drawings. As shown in FIG. 1, the Fabry-Perot interferometer is provided with a layered optical mirror at the center of a membrane Men. The layered optical mirror includes a lower mirror M1 and an upper mirror M2 with an air gap Ag between them.

In FIG. 1, an insulating layer 2 such as a silicon dioxide layer is formed over the entire surface of a semiconductor substrate 1 made of such as silicon. A first high refractive-index layer 3 made of such as Poly-Si is formed for a first refractive index over the entire surface of the semiconductor substrate 1 with the insulating layer 2 between them.

The first high refractive-index layer 3 includes a first low refractive-index layer 4 made of such as an air layer corresponding to the layered optical mirror. The first low refractive-index layer 4 features a second refractive index that is lower than a first refractive index. A second high refractive-index layer 5 is layered over a surface of the first high refractive-index layer 3 including the top of the first low refractive-index layer 4. The second high refractive-index layer 5 is made of such as Poly-Si and features the first refractive index. The first low refractive-index layer 4 is sandwiched between the first high refractive-index layer 3 and the second high refractive-index layer 5.

Figure 2A:
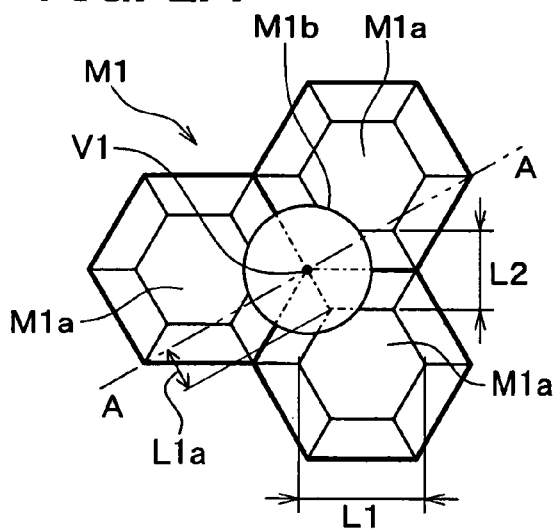
FIGS. 2A and 2B show a top surface layout of an optical multilayer mirror for the Fabry-Perot interferometer of FIG. 1.

The second high refractive-index layer 5 covers the top surface of the first low refractive-index layer 4 and surrounds its sides. A portion 5a of the second high refractive-index layer 5 surrounds sides of the first low refractive-index layer 4 and functions as a reinforcing section of the first low refractive-index layer 4. The portion 5a helps prevent deformation of the first low refractive-index layer 4 that lacks a mechanical strength. According to the embodiment, the first low refractive-index layer 4 is segmented into multiple portions. As shown in FIG. 2A, each of the segmented portions is hexagonal at its top. The multiple first low refractive-index layers 4 are honeycombed. That is, a truncated six-sided pyramidic space is formed by the portions 5a of the second high refractive-index layer 5 surrounding the top surface and sides of the first low refractive-index layer 4 and the first high refractive-index layer 3. The inside of the space functions as the first low refractive-index layer 4.

The portion 5a of the second high refractive-index layer 5 forms a side of the truncated six-sided pyramid and functions as a reinforcing section for the first low refractive-index layer 4. As seen from the sectional view in FIG. 3 corresponding to cross sectional vies taken along lines A-A and B-B of FIGS.2A and 2B, the reinforcing section of the second high refractive-index layer 5 slants against the first high refractive-index layer 3 at an angle of 45°. A stress is applied to the reinforcing section. For example, a stress results from an empty weight of the second high refractive-index layer 5 at the top of the truncated six-sided pyramid. Slanting the reinforcing section decreases the stress and can help prevent the second high refractive-index layer 5 from being bent. The angle of 45° can provide an optimum effect.

The first and second high refractive-index layers 3 and 5, and the first low refractive-index layer 4 provide the lower mirror M1. The lower mirror M1 transmits the light at the second high refractive-index layer 5 corresponding to the top of the first low refractive-index layer 4. The lower mirror M1 transmits no light (or little light) at the portion 5a of the second high refractive-index layer 5 corresponding to the side of the first low refractive-index layer 4. Part of the lower mirror M1 transmitting the light functions as a mirror unit M1a. That is, the lower mirror M1 includes an aggregate of the mirror units M1a formed by the segmented first low refractive-index layers 4.

As shown in FIG. 2A, L1 denotes a length of a diagonal between two opposite angles of the hexagon forming each mirror unit M1a, i.e., the hexagon formed at the top surface of the first low refractive-index layer 4. L2 denotes an interval between adjacent mirror units M1a, i.e., a width (i.e., top-view width) of the portion 5a of the second high refractive-index layer 5 functioning as the reinforcing section. In this case, L1 is greater than L2. Not only the diagonal between the angles but also a distance between opposite sides of the hexagon forming each mirror unit M1a is greater than the interval L2.

Figure 3:
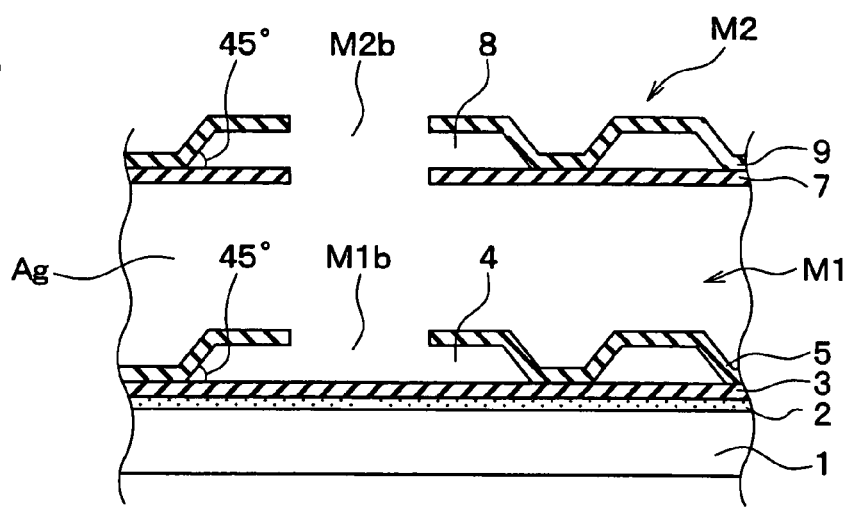
FIG. 3 is a fragmentarily enlarged schematic sectional view of the optical multilayer mirror in FIGS. 2A and 2B.

As shown in FIG. 2A, three adjacent mirror units M1a form a set. One hole M1b is formed in each set. The hole M1b is centered at a point V1 for collecting vertexes of three angles of the hexagons that form a set of mirror units M1a. The hole is formed by partially removing the second high refractive-index layer 5 as shown in FIG. 3. The hole M1b connects the space for providing the first low refractive-index layer 4 with the air gap Ag. This layout can decrease the number of holes M1b connecting with all the first low refractive-index layers 4. Further, in FIG. 2A, L1a donates in a top view a length from the point V1 to the adjacent angle of each hexagon. Here, a diameter of the hole M1b is larger than L1a; therefore, the hole M1b can directly reach the hexagonal top surface M1a of the first low refractive-index layer 4 from the point V1 without the reinforcing section 5a intervening, as shown in FIG. 2A.

Though not shown, the second high refractive-index layer 5 and the first high refractive-index layer 3 are each provided with a wiring layer made of a diffusion layer doped with impurities. The wiring layer applies a voltage to an electrode (hereafter referred to as a lower electrode) 11 for the lower mirror M1. The wiring layer can adjust potentials of the second high refractive-index layer 5 and the first high refractive-index layer 3.

An insulating layer 6 made of such as a silicon dioxide layer is formed over the top surface of the second high refractive-index layer 5 so as to avoid the lower mirror M1 and its vicinity. A third high refractive-index layer 7 and a fourth high refractive-index layer 9 with the first refractive index are formed almost all over the surface of the insulating layer 6 and positions around and opposite the lower mirror M1. A second low refractive-index layer 8 with the second refractive index is formed at the center of the third and fourth high refractive-index layers 7, 9. The membrane Men corresponds to an area except the surface of the insulating layer 6, i.e., a position near and opposite the lower mirror M1. The membrane Men is actually wider than the cross sectional view as shown in FIG. 1. The optical multilayer mirror includes the lower mirror M1 and the upper mirror M2 and is formed only in part of the membrane Men. FIG. 1 changes scales for convenience sake.

Specifically, the second low refractive-index layer 8 as an air layer corresponds to an area for the layered optical mirror in the third high refractive-index layer 7. The fourth high refractive-index layer 9 made of such as Poly-Si is layered over the surface of the third high refractive-index layer 7 including the part over the second low refractive-index layer 8. That is, the second low refractive-index layer 8 is sandwiched between the third high refractive-index layer 7 and the fourth high refractive-index layer 9.

Figure 2B:
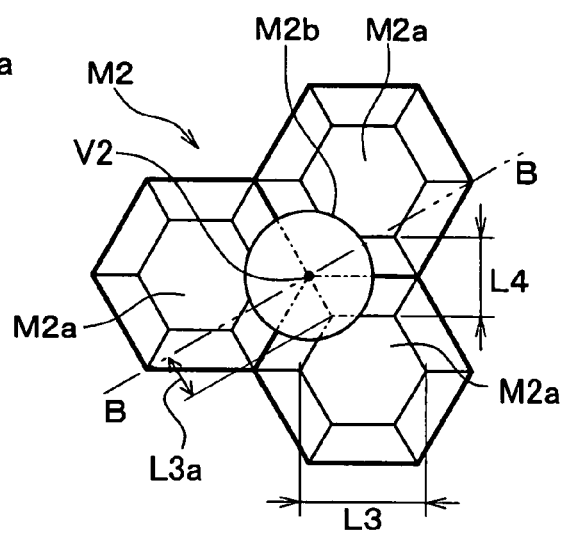

The fourth high refractive-index layer 9 covers the top surface of the second low refractive-index layer 8 and surrounds its sides. A portion 9a of the fourth high refractive-index layer 9 surrounds sides of the second low refractive-index layer 8 and functions as a reinforcing section of the second low refractive-index layer 8. The portion 9a prevents deformation of the second low refractive-index layer 8 that lacks a mechanical strength. According to the embodiment, the second low refractive-index layer 8 is segmented into multiple portions. As shown in FIG. 2B, each of the segmented portions is hexagonal at its top. The multiple second low refractive-index layers 8 are honeycombed. That is, a truncated six-sided pyramidic space is formed by the portions 9a of the fourth high refractive-index layer 9 surrounding the top surface and sides of the second low refractive-index layer 8 and the third high refractive-index layer 7. The inside of the space functions as the second low refractive-index layer 8.

The portion 9a of the fourth high refractive-index layer 9 forms a side of the truncated six-sided pyramid and functions as a reinforcing section for the second low refractive-index layer 8. As seen from the sectional view in FIG. 3, the reinforcing section of the fourth high refractive-index layer 9 slants against the third high refractive-index layer 7 at an angle of 45°. A stress is applied to the reinforcing section. For example, a stress results from an empty weight of the fourth high refractive-index layer 9 at the top of the truncated six-sided pyramid. Slanting the reinforcing section decreases the stress and can help prevent the fourth high refractive-index layer 9 from being bent. The angle of 45° can provide an optimum effect.

The third and fourth high refractive-index layers 7 and 9, and the second low refractive-index layer 8 provide the upper mirror M2. The upper mirror M2 transmits the light at the fourth high refractive-index layer 9 corresponding to the top surface of the second low refractive-index layer 8. The upper mirror M2 transmits no light (or little light) at the portion 9a of the fourth high refractive-index layer 9 corresponding to the side of the second low refractive-index layer 8. Part of the upper mirror M2 transmitting the light functions as a mirror unit M2a. That is, the upper mirror M2 includes an aggregate of the mirror units M2a formed by the segmented second low refractive-index layers 8.

According to the above-mentioned configuration, the same top surface layout is used for the upper mirror M2 and the lower mirror M1. As shown in FIGS. 2A and 2B, the honeycomb top surface layout of the second low refractive-index layer 8 and the fourth high refractive-index layer 9 is similar to that of the first low refractive-index layer 4 and the second high refractive-index layer 5. According to this configuration, the light can pass through a portion functioning as a mirror of the upper mirror M2 and can be effectively incident on a portion functioning as a mirror of the lower mirror M1.

As shown in FIG. 2B, L3 denotes a length of a diagonal between two opposite angles of the hexagon forming each mirror unit M2a, i.e., the hexagon formed at the top surface of the second low refractive-index layer 8. L4 denotes an interval between adjacent mirror units M2a, i.e., a width (top-view width) of the portion 9a of the fourth high refractive-index layer 9 functioning as the reinforcing section. In this case, L3 is greater than L4. Not only the diagonal between the angles but also a distance between opposite sides of the hexagon forming each mirror unit M2a is greater than the interval L4. Providing too large an area for the reinforcing section degrades the area efficiency, i.e., an area for the portion functioning as a mirror in the area for the optical multilayer mirror. The configuration can solve this problem.

As shown in FIG. 2B, three adjacent mirror units M2a form a set. One hole M2b is formed in each set. Specifically, one hole M2b is formed in each set of three adjacent mirror units M2a. The hole M2b is centered at a point (V2) for collecting vertexes of three angles of the hexagons that form a set of mirror units M2a. The hole is formed by partially removing the third and fourth high refractive-index layers 7 and 9. The hole M2b connects the space for providing the second low refractive-index layer 8, the space over the upper mirror M2, and the air gap Ag with each other. This layout can decrease the number of holes M2b connecting with all the second low refractive-index layers 8. The hole M2b is formed in the upper mirror M2 so as to correspond to the hole M1b in the lower mirror M1 as shown in FIGS. 2B and 3. Further, in FIG. 2B, L3a donates in a top view a length from the point V2 to the adjacent angle of each hexagon. Here, a diameter of the hole M2b is larger than L3a; therefore, the hole M2b can directly reach the hexagonal top surface M2a of the second low refractive-index layer 8 from the point V2 without the reinforcing section 9a intervening, as shown in FIG. 2B.

Though not shown, the fourth high refractive-index layer 9 and the third high refractive-index layer 7 are each provided with a wiring layer made of a diffusion layer doped with impurities. The wiring layer applies a voltage to an electrode (hereafter referred to as an upper electrode) 12 for the upper mirror M2. The wiring layer can adjust potentials of the fourth high refractive-index layer 9 and the third high refractive-index layer 7.

An opening 10 is formed in the third and fourth high refractive-index layers 7 and 9 and the insulating layer 6 along a periphery outside the membrane Men; the opening 10 reaches the second high refractive-index layer 5. A lower electrode 11 made of such as Au/Cr is formed in the opening 10. The lower electrode 11 makes an ohmic contact with a wiring section (not shown) that is made of a diffusion layer containing impurities and is provided for the second high refractive-index layer 5. Similarly, an upper electrode 12 made of such as Au/Cr is provided for the surface of the fourth high refractive-index layer 9 along the periphery outside the membrane Men. The upper electrode 12 makes an ohmic contact with a wiring section (not shown) that is made of a diffusion layer containing impurities and is provided for the fourth high refractive-index layer 9. The wiring sections are preferably formed for the second high refractive-index layer 5 and the fourth high refractive-index layer 9 by doping along the periphery outside the lower mirror M1 and the upper mirror M2 or only the reinforcing section of the same with impurities. This is because doped impurities absorb the light. It is preferable to prevent impurities from being introduced into the part functioning as the mirror.

Though not for the wiring section, impurities can be doped for part of the first high refractive-index layer 3 corresponding to the hole M1$b$ connecting to the first low refractive-index layer 4. The purpose is to prevent unnecessary light from being transmitted at that part.

A hole 13 is formed within the membrane Men to pierce the third and fourth high refractive-index layers 7 and 9 and connect the air gap Ag with the outside.

The Fabry-Perot interferometer according to the embodiment is configured based on the above-mentioned structure. The following describes a manufacturing process for the Fabry-Perot interferometer with reference to FIGS. 4A to 4C and 5A to 5C showing a manufacturing process for the Fabry-Perot interferometer.

Figure 4A:
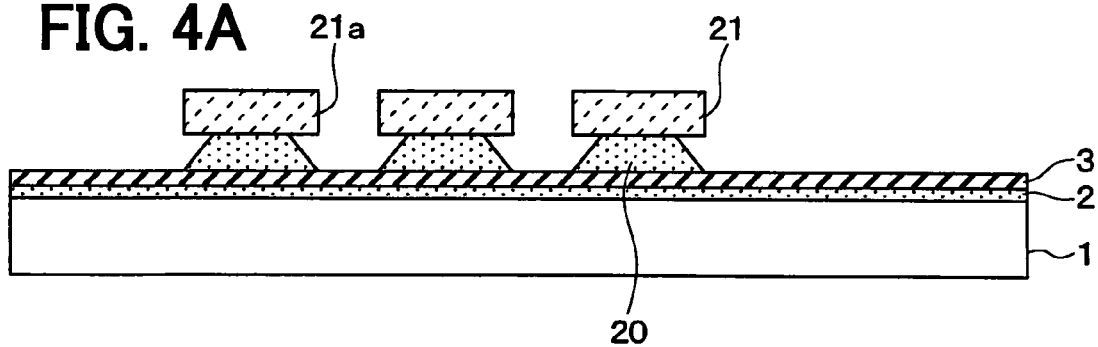
FIGS. 4A to 4C show a manufacturing process for the Fabry-Perot interferometer of FIG. 1.

(Process in FIG. 4A)

There is provided a semiconductor substrate 1 made of such as silicon. The entire surface of the semiconductor substrate 1 is deposited with the insulating layer 2 made of such as a silicon dioxide layer and the first high refractive-index layer 3 made of such as Poly-Si. The entire surface of the first high refractive-index layer 3 is deposited with a protective layer 20 made of such as a silicon dioxide layer, i.e., a material indicating a high etching selectivity in relation to the first and second high refractive-index layers 3 and 5. The thickness of the protective layer 20 is equivalent to that of the first low refractive-index layer 4 mentioned above. The surface of the protective layer 20 is then deposited with a resist 21. An opening 21$a$ is formed so as to leave only part of the resist 21 corresponding to a position scheduled to form the first low refractive-index layer 4. In this state, wet etching (isotropic etching) and, as needed, dry etching (anisotropic etching) are conducted to shape the protective layer 20 into a truncated six-sided pyramid. The resist 21 is then removed.

Figure 4B:
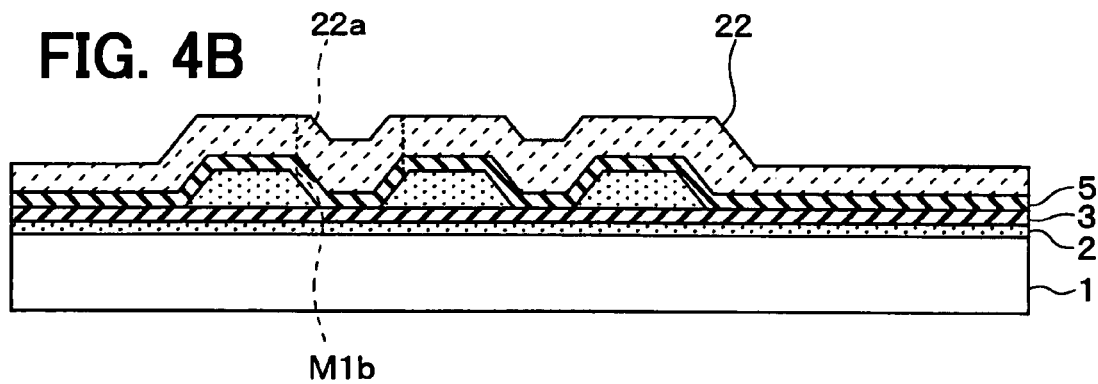

(Process in FIG. 4B)

The second high refractive-index layer 5 made of such as Poly-Si is deposited to the entire surface of the protective layer 20 and part of the first high refractive-index layer 3 not covered by the protective layer 20. Since the protective layer 20 is shaped into a truncated six-sided pyramid, the shape is applied to part of the second high refractive-index layer 5 over the protective layer 20. That part is also shaped into a truncated six-sided pyramid.

A resist 22 is applied to the surface of the second high refractive-index layer 5. In another sectional view than FIG. 4B, an opening 22$a$ is provided for part of the resist 22 corresponding to the hole M1$b$ of the lower mirror M1. The resist 22 is used as a mask for dry etching (anisotropic etching) to open the hole M1$b$. The second high refractive-index layer 5 is shaped into a truncated six-sided pyramid. When the hole M1$b$ is formed, little residue remains near a boundary between the first high refractive-index layer 3 and the protective layer 20.

After the resist 22 is then removed, impurities are ion-implanted using a mask (not shown) having an opening for a wiring section formation region.

Figure 4C:
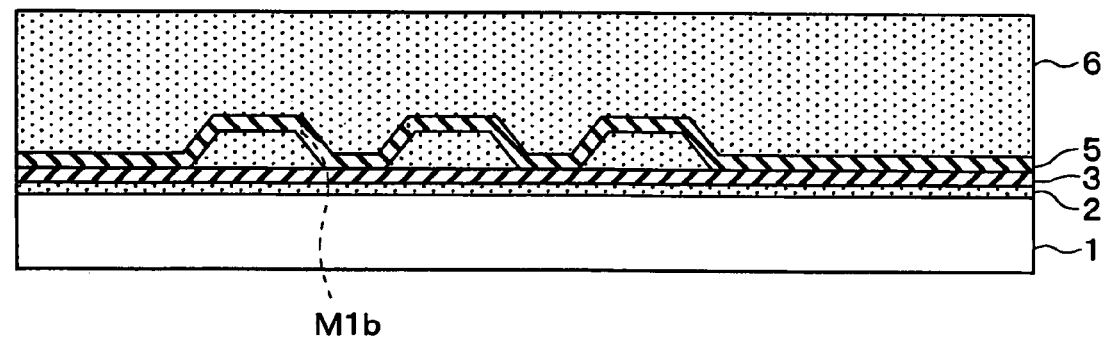

(Process in FIG. 4C)

The insulating layer 6 made of such as a silicon dioxide layer is deposited to the entire surface of the second high refractive-index layer 5. The thickness of the insulating layer 6 is equal to the size of the air gap Ag, i.e., an interval between the lower mirror M1 and the upper mirror M2. Depending on the thickness of the insulating layer 6, its surface may be patterned indented due to the shape of the second high refractive-index layer 5. This causes no problem.

Figure 5A:
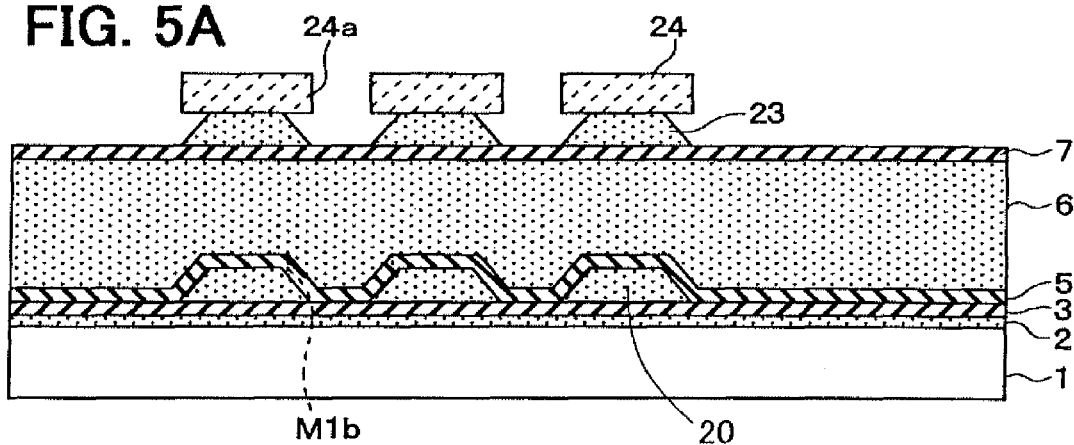
FIGS. 5A to 5C show a manufacturing process subsequent to FIGS. 4A to 4C for the Fabry-Perot interferometer.

(Process in FIG. 5A)

The entire surface of the insulating layer 6 is deposited with the third high refractive-index layer 7 made of such as Poly-Si. The entire surface of the second high refractive-index layer 7 is deposited with a protective layer 23 made of such as a silicon dioxide layer, i.e., a material indicating a high etching selectivity in relation to the third and fourth high refractive-index layers 7 and 9. The thickness of the protective layer 23 is equivalent to that of the second low refractive-index layer 8 mentioned above. The surface of the protective layer 23 is then deposited with a resist 24. An opening 24$a$ is formed so as to leave only part of the resist 24 corresponding to a position scheduled to form the second low refractive-index layer 8. In this state, wet etching (isotropic etching) and, as needed, dry etching (anisotropic etching) are conducted to shape the protective layer 23 into a truncated six-sided pyramid. The resist 24 is then removed.

Figure 5B:
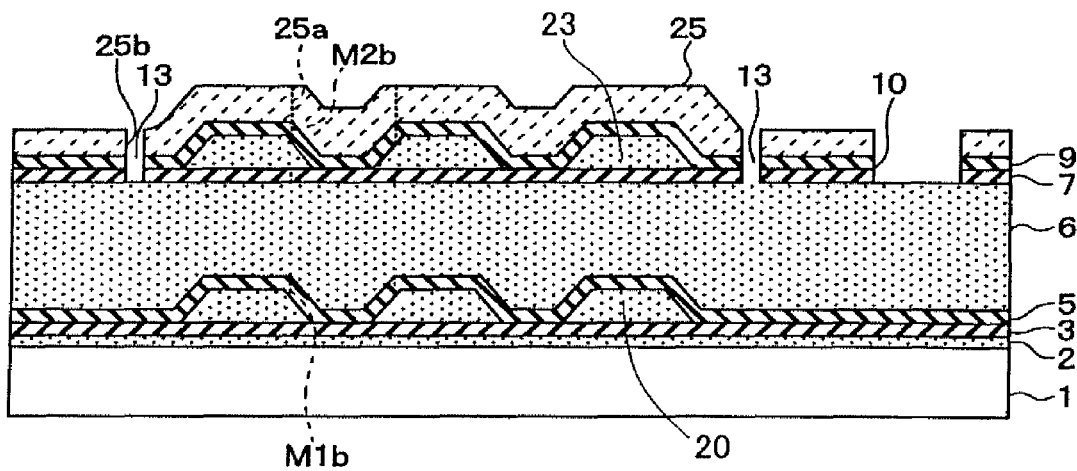

(Process in FIG. 5B)

The fourth high refractive-index layer 9 made of such as Poly-Si is deposited to the entire surface of the protective layer 23 and part of the third high refractive-index layer 7 not covered by the protective layer 23. Since the protective layer 23 is shaped into a truncated six-sided pyramid, the shape is applied to part of the fourth high refractive-index layer 9 over the protective layer 23. That part is also shaped into a truncated six-sided pyramid.

Impurities are ion-implanted using a mask (not shown) having an opening for a wiring section formation region. The mask is then removed.

The surface of the fourth high refractive-index layer 9 is deposited with a resist 25. An opening 25$a$ (another sectional view than FIG. 5B) is provided for part of the resist 25 corresponding to the hole M2$b$ of the upper mirror M2. An opening 25$b$ is provided for a portion corresponding to the opening 10 or the hole 13. The resist 25 is used as a mask for dry etching (anisotropic etching) to open the holes M2$b$ and 13 and form part of the opening 10.

Figure 5C:
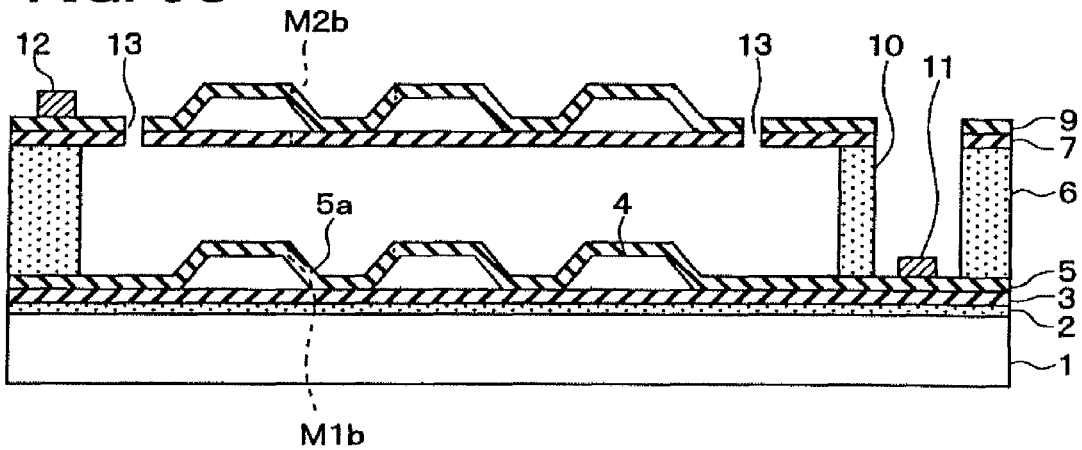

(Process in FIG. 5C)

After the resist 25 is removed, the fourth high refractive-index layer 9 is used as a mask for anisotropic etching. The insulating layer 6 is partially removed to form the opening 10. Anisotropic etching may be conducted by applying the mask to the part of the fourth high refractive-index layer 9 corresponding to the membrane Men. This can prevent the insulating layer 6 from being removed through the hole M2$b$ or 13. However, removing the insulating layer 6 facilitates removal of the insulating layer 6 under the membrane Men for forming it.

The mask used for covering the opening 10 is removed. A metal mask is used to deposit Au/Cr. The lower electrode 11 is formed in the opening 10. The upper electrode 12 is formed along the periphery outside the membrane Men. These electrodes are ground and polished as needed. The protective layers 20 and 23 are etched from the spaces for the insulating layer 6 and the first and second low refractive-index layers 4 and 8 through the hole M2b of the upper mirror M2, the hole 13 outside it, and the hole M1b of the lower mirror M1. When needed, a mask (not shown) may be used to cover the opening 10 so that the insulating layer 6 exposed from the opening 10 is not removed. The etching removes the part of the insulating layer 6 below the membrane Men, forming the air gap Ag and configuring the first and second low refractive-index layers 4 and 8.

The manufacturing method completes the Fabry-Perot interferometer as shown in FIG. 1 having the optical multilayer mirror according to the embodiment.

In the Fabry-Perot interferometer having the optical multilayer mirror, varying a voltage applied to the lower electrode 11 and the upper electrode 12 varies an electrostatic attraction between the lower mirror M1 and the upper mirror M2. The height of the air gap Ag between them varies. Adjusting the gap between the lower mirror M1 and the upper mirror M2 can make available the spectroscopy based on a wide high-reflectance band.

As mentioned above, the Fabry-Perot interferometer having the optical multilayer mirror according to the embodiment is provided with the reinforcing section. The reinforcing section is equivalent to each of walls of the second and fourth high refractive-index layers 5 and 9. That is, the reinforcing section crosses each of the first and second low refractive-index layers 4 and 8 and supports the part of each of the second and fourth high refractive-index layers 5 and 9 covering the top of each of the first and second low refractive-index layers 4 and 8. Even when the first and second low refractive-index layers 4 and 8 lack a mechanical strength, the reinforcing section can help prevent the second and fourth high refractive-index layers 5 and 9 from being bent. The first through fourth high refractive-index layers 3, 5, 7, and 9 can be made of a high refractive-index material such as Ge (refractive index 4) and Si (refractive index 3.45) transparent against a wavelength band from 3 to 9 µm. The first and second low refractive-index layers 4 and 8 can be made of a material such as air (refractive index 1) and vacuum featuring a smaller refractive index than $SiO_2$ (refractive index 1.44). Even when the n ratio is high (e.g., 3.4 or more), the second and fourth high refractive-index layers 5 and 9 are not bent. The Fabry-Perot interferometer can be provided with the optical multilayer mirror featuring a wide high-reflectance band.

The Fabry-Perot interferometer according to the embodiment is configured as follows. With reference to the lower mirror M1, the second high refractive-index layer 5 reaches the first high refractive-index layer 3 through the first low refractive-index layer 4. The portion 5a of the second high refractive-index layer 5 forms the reinforcing section. The portion 5a reaches the first high refractive-index layer 3 from the part of the first low refractive-index layer 4 corresponding to its top. Similarly, with reference to the upper mirror M2, the fourth high refractive-index layer 9 reaches the third high refractive-index layer 7 through the second low refractive-index layer 8. The portion 9a of the fourth high refractive-index layer 9 forms the reinforcing section. The portion 9a reaches the third high refractive-index layer 7 from the part of the second low refractive-index layer 8 corresponding to its top. This configuration can simplify the optical multilayer mirror structure. It is possible to eliminate a process needed for forming only the reinforcing section during manufacture of the optical multilayer mirror.

The above-mentioned Fabry-Perot interferometer according to Patent Document 1 needs to measure a wavelength band from 3 to 9 µm by diving the band. The number of interferometers needed corresponds to the number of divided bands, increasing the apparatus size. The interferometer's design and driving needs to be optimized for each of the divided bands, increasing costs for controlling processes and driving. By contrast, the Fabry-Perot interferometer according to the embodiment can widen the high-reflectance band and be free from these problems.

A highly reflective film is generally formed by depositing a metal layer. However, the metal increases an absorption coefficient in an infrared region greater than or equal to one µm. This method is inapplicable to a transmission-type device used for a band of three through ten µm. On the other hand, the embodiment can form a highly reflective film (lower mirror M1 and upper mirror M2) without using the metal. The embodiment is appropriately applicable to the transmission-type device.

Second Embodiment

A second embodiment of the invention will be described. The Fabry-Perot interferometer according to the second embodiment changes the configuration of the holes M1b and M2b according to the first embodiment. The other parts of the configuration are the same as those of the first embodiment. Only differences will be described.

Figure 6A:
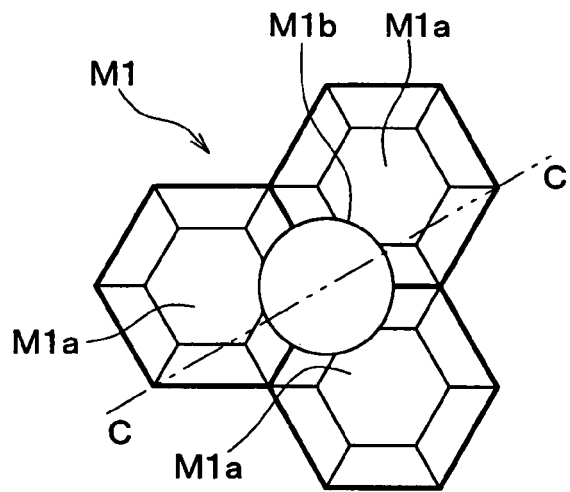
FIGS. 6A and 6B show a top surface layout of an optical multilayer mirror for a Fabry-Perot interferometer according to a second embodiment of the invention.
Figure 6B:
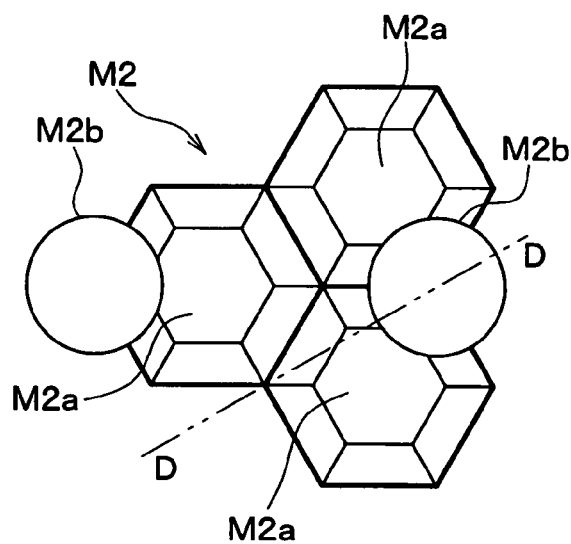
Figure 7:
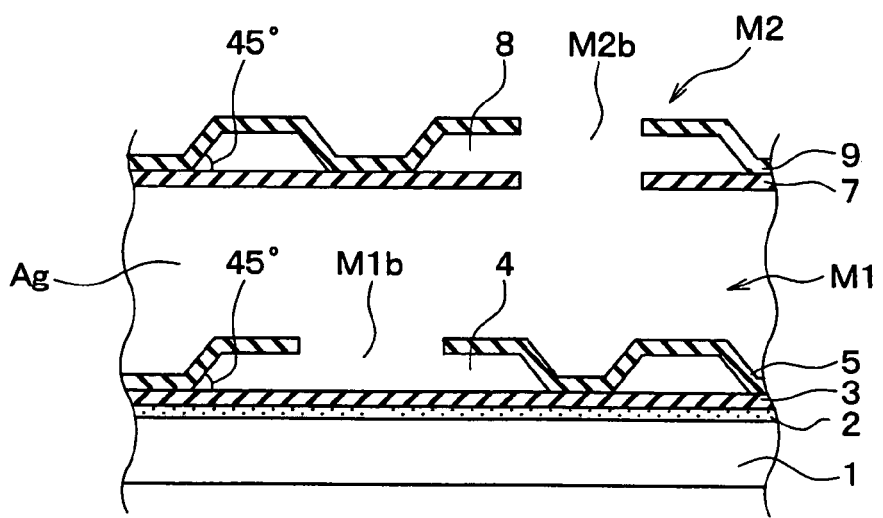
FIG. 7 is a fragmentarily enlarged schematic sectional view of the optical multilayer mirror in FIGS. 6A and 6B.

FIGS. 6A and 6B show a top surface layout of an optical multilayer mirror for a Fabry-Perot interferometer according to the second embodiment of the invention. FIG. 7 is a fragmentarily enlarged schematic sectional view of the optical multilayer mirror provided for the Fabry-Perot interferometer according to the embodiment and corresponds to cross sectional views taken along lines C-C and D-D of FIGS. 6A and 6B.

As seen from these drawings, the embodiment forms the hole M2b in the upper mirror M2 so as to deviate from the hole M1b in the lower mirror M1.

According to the first embodiment, the light may enter through the holes M1b and M2b when the hole M2b is formed in the upper mirror M2 so as to correspond to the hole M1b in the lower mirror M1.

According to the second embodiment, the hole M2b is formed in the upper mirror M2 so as to deviate from the hole M1b in the lower mirror M1. Part of the lower mirror M1 not functioning as a mirror can block out and diffuse the light entering from the hole M2b. The high-precision Fabry-Perot interferometer is available.

Third Embodiment

A third embodiment of the invention will be described. The Fabry-Perot interferometer according to the third embodiment changes the structure between the first and second high refractive-index layers 3 and 5 according to the first embodiment. The other parts of the configuration are the same as those of the first embodiment. Only differences will be described.

Figure 8:
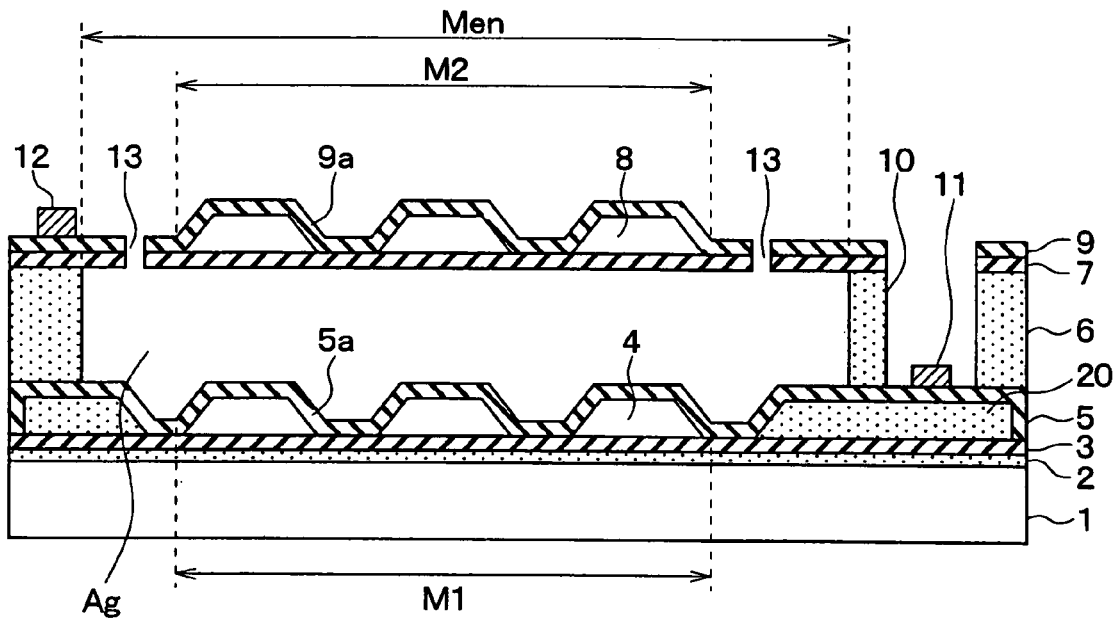
FIG. 8 is a sectional view of a Fabry-Perot interferometer having an optical multilayer mirror according to a third embodiment of the invention.

FIG. 8 is a sectional view of a Fabry-Perot interferometer according to the embodiment. As shown in FIG. 8, the Fabry-Perot interferometer contains the protective layer 20 remained between the first and second high refractive-index layers 3 and 5 in regions other than the lower mirror M1. The first and second high refractive-index layers 3 and 5 below the membrane Men have little effect on operations of the Fabry-Perot interferometer in the regions other than the lower mirror M1. In such regions, the protective layer 20 may remain between the first and second high refractive-index layers 3 and 5.

Fourth Embodiment

A fourth embodiment of the invention will be described. The Fabry-Perot interferometer according to the fourth embodiment changes the shape of the lower mirror M1 and the upper mirror M2 according to the first embodiment. The other parts of the configuration are the same as those of the first embodiment. Only differences will be described.

Figure 9:
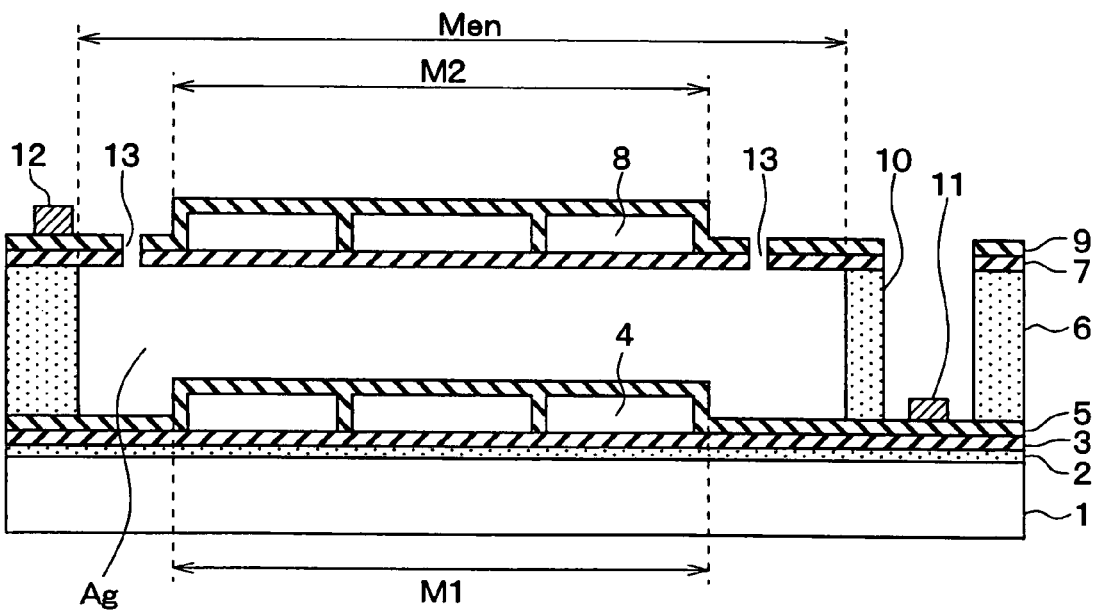
FIG. 9 is a sectional view of a Fabry-Perot interferometer having an optical multilayer mirror according to a fourth embodiment of the invention.

FIG. 9 is a sectional view of a Fabry-Perot interferometer according to the fourth embodiment. As shown in FIG. 9, the Fabry-Perot interferometer uses the first and second low refractive-index layers 4 and 8 each shaped into a hexagonal column. The second and fourth high refractive-index layers 5 and 9 are also shaped accordingly. Such shapes can provide a reinforcing section corresponding to each part of the second and fourth high refractive-index layers 5 and 9 on each side of the first and second low refractive-index layers 4 and 8. The Fabry-Perot interferometer can be provided with the optical multilayer mirror featuring a wide high-reflectance band.

In consideration for a stress applied to the reinforcing section and residue due to formation of the hole M1b in the lower mirror M1 by etching, it is preferable to shape the first and second low refractive-index layers 4 and 8 into a truncated six-sided pyramid.

Fifth Embodiment

A fifth embodiment of the invention will be described. The Fabry-Perot interferometer according to the embodiment specifies arrangement of the hole 13 formed in the third and fourth high refractive-index layers 7 and 9 each along the periphery outside the upper mirror M2 according to the first embodiment. The other parts of the configuration are the same as those of the first embodiment. Only differences will be described.

Figure 10:
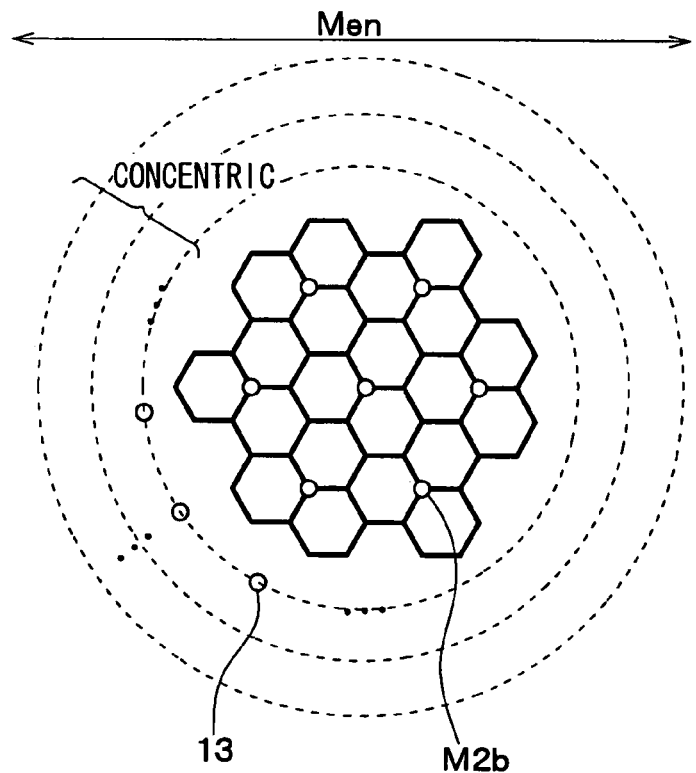
FIG. 10 shows a top surface layout of a Fabry-Perot interferometer having an optical multilayer mirror according to a fifth embodiment of the invention.

FIG. 10 shows a top surface layout of a Fabry-Perot interferometer according to the fifth embodiment. As shown in FIG. 10, equally sized holes 13 are formed in the third and fourth high refractive-index layers 7 and 9 along the periphery outside the upper mirror M2. The holes 13 are arranged along concentric circles at the same interval around the upper mirror M2 outside it. The interval between the adjacent holes 13 along the same circle and the shortest interval between the holes 13 along the adjacent circles are equal to the interval between the holes M2b formed in the upper mirror M2.

This configuration can etch the insulating layer 6 through the hole 13 or M2b to the end of the membrane Men in a short period of time. A large-area membrane Men can be configured without requiring a long etching time. The membrane Men can be efficiently fabricated because a uniform amount of etching can be conducted through the holes 13 and M2b.

Other Embodiments

The first and second low refractive-index layers 4 and 8 are shaped into truncated six-sided pyramids according to the first through third embodiments and hexagonal columns according to the fourth embodiment. These are only examples. The layers may be shaped into the other types of truncated pyramids or columns. However, the truncated six-sided pyramid or the hexagonal column is more preferable than the other types because of excellent area efficiency, i.e., an area functioning as the mirror against an area equivalent to the optical multilayer mirror.

According to the fourth embodiment, the first and second low refractive-index layers 4 and 8 are segmented into multiple portions. In the region functioning as the optical multilayer mirror, only one first low refractive-index layer 4 may be provided between the first and second high refractive-index layers 3 and 5. Similarly, only one second low refractive-index layer 8 may be provided between the third and fourth high refractive-index layers 7 and 9. The reinforcing section may be provided so as to partially cross the first and second low refractive-index layers 4 and 8.

Figure 11:
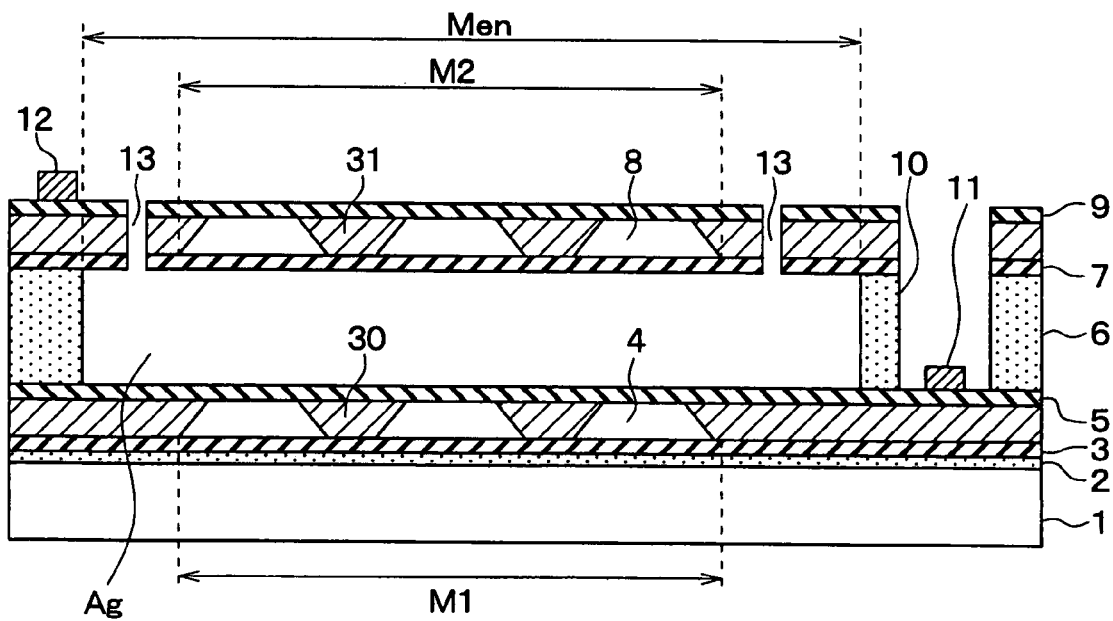
FIG. 11 is a sectional view of a Fabry-Perot interferometer having a reinforcing section made of a material different from that used for second and fourth high refractive-index layers according to the other embodiments.

The above-mentioned embodiments have described the example of configuring the reinforcing section using part of the second and fourth high refractive-index layers 5 and 9. The reinforcing section may be made of a material different from that of the second and fourth high refractive-index layers 5 and 9. FIG. 11 shows an example of configuring the reinforcing section using a material different from that of the second and fourth high refractive-index layers 5 and 9. As shown in FIG. 11, metal layers 30 and 31 configure reinforcing sections for the lower mirror M1 and the upper mirror M2. The height of the metal layers 31 and 31 is equal to that of the first and second low refractive-index layers 4 and 8. The second and fourth high refractive-index layers 5 and 9 cover tops of the first and second low refractive-index layers 4 and 8 and of the metal layers 30 and 31. In this manner, the reinforcing section can be configured using a material different from that of the second and fourth high refractive-index layers 5 and 9.

This structure can be formed as follows. After the processes as shown in FIGS. 4A and 5A, a metal film for configuring the metal layers 30 and 31 is applied to the surfaces of the protective layers 20 and 23 and the first and third high refractive-index layers 3 and 7. The metal film is flattened to form the metal layers 30 and 31 so as to be equal to the height of the protective layers 20 and 23. The process as described in the first embodiment is conducted subsequently.

The first through fifth embodiments have described the example of configuring the first and second low refractive-index layers 4 and 8 using air layers. The layers may be configured with vacuum or a material whose refractive index is smaller than 1.44. For example, the first and second low refractive-index layers 4 and 8 can be made of vacuum by performing the process in FIG. 5C and then introducing the Fabry-Perot interferometer into a vacuum apparatus so as to be assembled to a hermetic container. The layers can be made of a material with its refractive index smaller than 1.44 by filling the layers with the material provided as liquid, gas, sol, or gel through the hole M1b, M2b, or 13 after the process in FIG. 5C. In this case, the air gap Ag in the first embodiment or elsewhere is filled with the material whose refractive index is smaller than 1.44. Even when the liquid, gas, sol, or gel is filled, the gap between the lower mirror M1 and the upper mirror M2 can be adjusted based on a voltage applied to the lower electrode 11 and the upper electrode 12. The Fabry-Perot interferometer can be thereby used for spectroscopy.

The above-mentioned embodiments have described the example of the optical multilayer mirror having the lower and upper mirrors. The optical multilayer mirror may include at least one mirror to include: a first high refractive-index layer featuring a first refractive index; a first low refractive-index layer that is arranged at part of the first high refractive-index layer functioning as the mirror and features a second refractive index smaller than the first refractive index; and a second high refractive-index layer formed to cover the first low refractive-index layer. In this case, the reinforcing section crosses the first low refractive-index layer and reaches the first high refractive-index layer to support part of the second high refractive-index layer covering the top of the first low refractive-index layer.

Incidentally, the following will explain a reason to conceive that the use of a low refractive-index material indicating a refractive index smaller than $SiO_2$ (refractive index 1.44) can achieve a high n ratio (e.g., 3.4 or more) and provide an optical multilayer mirror featuring a high-reflectance band.

Figure 12A:
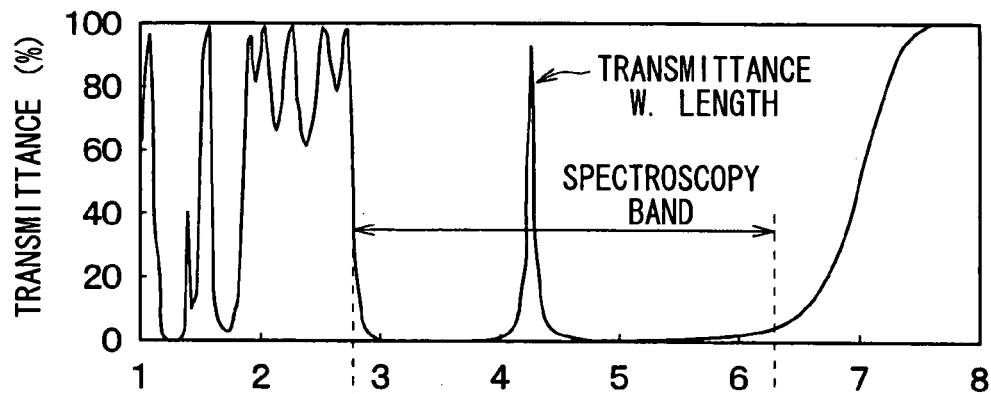
FIG. 12A is a characteristic chart showing relationship between a wavelength and an FP transmittance.
Figure 12B:
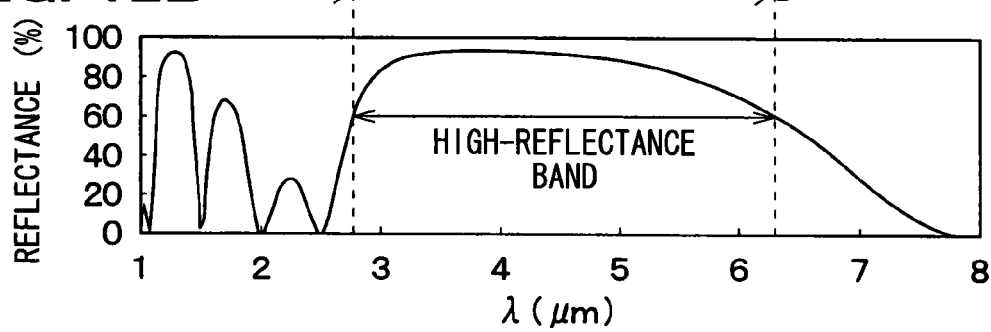
FIG. 12B is a characteristic chart showing dependence of a reflectance on a wavelength.

FIG. 12B is a characteristic chart showing dependence of a reflectance on a wavelength when the optical multilayer is used to configure the high-reflectance mirror. As seen from FIG. 12B, however, the optical multilayer largely depends on the wavelength and narrows the mirror's high-reflectance band. FIG. 12A shows relationship between the wavelength and the FP transmittance. As seen from FIG. 12A, the Fabry-Perot interferometer's spectroscopy band corresponds to the mirror's high-reflectance band. The Fabry-Perot interferometer using the mirror with a narrow high-reflectance band narrows the spectroscopy band.

Figure 13:
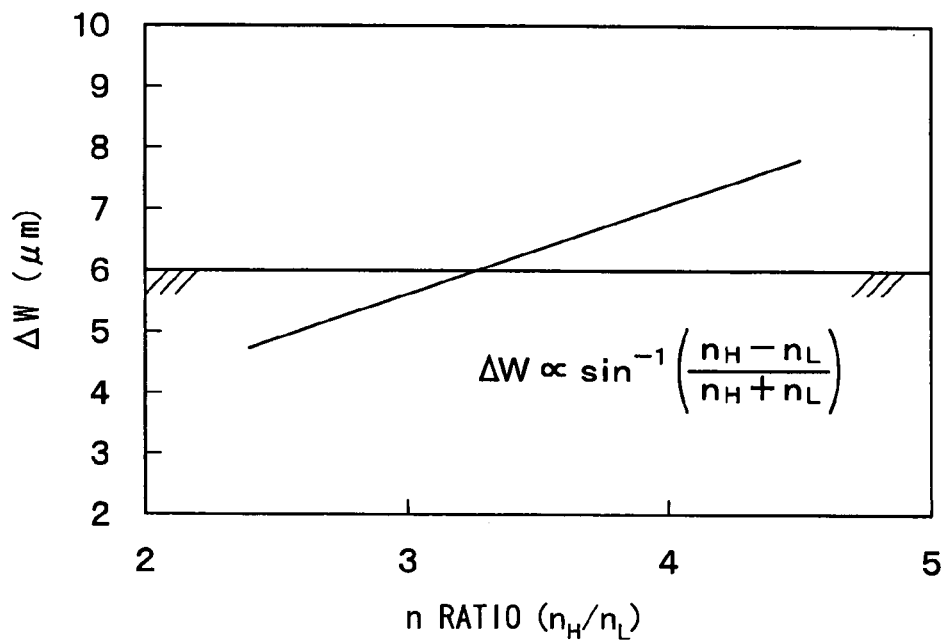
FIG. 13 is a graph showing refractive index ratio dependence in a high refractive-index band for the optical multilayer mirror.

An optical multilayer mirror is made of an optical multilayer including a layer of high and low refractive-index films. In such an optical multilayer mirror, a high-reflectance band depends on a refractive index ratio (n ratio) between a high refractive index $n_H$ and a low refractive index $n_L$. FIG. 13 shows refractive index ratio dependence, i.e., a band $\Delta W$ in relation to the n ratio ($n_H/n_L$), in a high refractive-index band for the optical multilayer mirror. Increasing the n ratio widens the band $\Delta W$. Let us suppose that the mirror's high-reflectance band features a wavelength of 3 to 9 µm as shown in FIG. 12B. The band $\Delta W$ is 6 µm or more. The n ration needs to be approximately 3.3 or more.

Materials such as Ge (refractive index 4) and Si (refractive index 3.45) can be used for a semiconductor process and be transparent against a wavelength from 3 to 9 µm. Materials such as $SiO_2$ (refractive index 1.44) and SiN (refractive index 2) indicate low refractive indexes. However, a combination of these high and low refractive-index materials cannot provide a high n ratio.

For example, air (refractive index 1) or vacuum can be used as a low refractive-index material indicating a refractive index smaller than $SiO_2$ (refractive index 1.44). Thus, it is conceived that the use of such material can achieve a high n ratio (e.g., 3.4 or more) and provide an optical multilayer mirror featuring a high-reflectance band.

Here, when the low refractive-index material such as air and vacuum is used as part of the layered film, a layer made of the low refractive-index material, however, lacks mechanical strength. A film formed over the low refractive-index material may be bent, for example. In consideration of this issue, the above-disclosed embodiments according to the present invention are thereby devised.

In addition, aspects of the subject matter described herein are set out in the following clauses.

As an aspect, an optical multilayer mirror is provided as follows. The optical multilayer mirror includes a lower mirror and an upper mirror. The lower mirror is arranged over a substrate, while the upper mirror faces the lower mirror via a gap. The lower mirror includes: a first high refractive-index layer that is arranged over the substrate and features a first refractive index; a first low refractive-index layer that is arranged to face the first high refractive-index layer and features a second refractive index smaller than the first refractive index; a second high refractive-index layer that is arranged to cover the first low refractive-index layer; and a first reinforcing section that is configured to support a portion of the second high refractive-index layer covering a top surface of the first low refractive-index layer and reach the first high refractive-index layer via the first low refractive-index layer. The upper mirror includes: a third high refractive-index layer that is arranged over the substrate and features the first refractive index; a second low refractive-index layer that is arranged to face the third high refractive-index layer and features the second refractive index; a fourth high refractive-index layer that is arranged to cover the second low refractive-index layer; and a second reinforcing section that is configured to support a portion of the fourth high refractive-index layer covering a top surface of the second low refractive-index layer and reach the third high refractive-index layer via the second low refractive-index layer.

The lower mirror is provided with the first reinforcing section that supports the portion of the second high refractive-index layer covering the top surface of the first low refractive-index layer. The upper mirror is provided with the second reinforcing section that supports the portion of the fourth high refractive-index layer covering the top surface of the second low refractive-index layer. Even when the first and second low refractive-index layers lack mechanical strength, each reinforcing section can help prevent the second and fourth high refractive-index layers from being bent. When a high n ratio is achieved by selecting a material for the first through fourth high refractive-index layers or the first and second low refractive-index layers, the second and fourth high refractive-index layers may not bend. The Fabry-Perot interferometer can be provided with the optical multilayer mirror featuring a wide high-reflectance band.

According to the configuration, the first and second low refractive-index layers are made of one of gas, liquid, vacuum, sol, and gel. For example, the first and second low refractive-index layers can be made of air.

According to the above-mentioned configuration, the first reinforcing section included in the lower mirror may correspond to a first portion of the second high refractive-index layer. Here, the first portion ranges between a portion opposed to the top surface of the first low refractive-index layer and a portion reaching the first high refractive-index layer by crossing the first low refractive-index layer. Similarly, the second reinforcing section included in the upper mirror may correspond to a second portion of the fourth high refractive-index layer. Here, the second portion ranges between a portion opposed to the top surface of the second low refractive-index layer and a portion reaching the third high refractive-index layer by crossing the second low refractive-index layer.

The structure can be simplified by making the reinforcing section out of part of the second or fourth high refractive-index layer. For example, it is possible to eliminate a process needed for forming only the reinforcing section during manufacture of the optical multilayer mirror.

In this case, the first low refractive-index layer may be divided into a plurality of segmented portions and the first reinforcing section may be configured as a portion of the second high refractive-index layer opposed to a side of each of the segmented portions. Similarly, the second low refractive-index layer may be divided into a plurality of segmented portions and the second reinforcing section may be configured as a portion of the fourth high refractive-index layer opposed to a side of each of the segmented portions.

On the other hand, the first reinforcing section may be configured as a first metal layer that crosses the first low refractive-index layer and ranges between the second high refractive-index layer and the first high refractive-index layer. Similarly, the second reinforcing section may be configured as a second metal layer (31) that crosses the second low refractive-index layer and ranges between the fourth high refractive-index layer and the third high refractive-index layer.

In this case, the first low refractive-index layer may be divided into a plurality of segmented portions and the first metal layer may be opposed to a side of each of the segmented portions. Similarly, the second low refractive-index layer may be divided into a plurality of segmented portions and the second metal layer may be opposed to a side of each of the segmented portions.

These structures preferably ensure a match between top-view layouts of the reinforcing sections for the lower and upper mirrors. When the top-view layouts match, the light passing through part of the upper mirror functioning as a mirror unit can be efficiently incident on part of the lower mirror functioning as a mirror unit.

In the lower mirror, for example, the first low refractive-index layer may be divided into segmented portions and a top surface of each of the segmented portions may have an identical polygonal shape. Similarly, in the upper mirror, the second low refractive-index layer may be divided into segmented portions and a top surface of each of the segmented portions may have the identical polygonal shape. It is possible to ensure a match between top-view layouts of the reinforcing sections for the lower and upper mirrors.

In this case, the first and second low refractive-index layers can be shaped into a multi-sided truncated pyramid, for example. When the first and second low refractive-index layers are shaped into a multi-sided truncated pyramid, part of the second high refractive-index layer corresponding to the side of the first low refractive-index layer can be shaped to be slanted against the first high refractive-index layer. This shape can decrease a stress applied to the reinforcing section and prevent the second and fourth high refractive-index layers from being bent. The part of the second high refractive-index layer corresponding to the side of the first low refractive-index layer slants against the first high refractive-index layer at a given angle. The angle of 45° can provide an optimum effect. Similarly, the first and second low refractive-index layers can be shaped into a multi-sided column.

It is preferable to divide the first and second low refractive-index layers so that each of the divided top surfaces becomes hexagonal. The divided first and second low refractive-index layers can be honeycombed. The honeycomb structure provides excellent area efficiency, i.e., an area for the portion functioning as a mirror unit in the area for the optical multi-layer mirror. The honeycomb structure is more preferable than the other multi-sided truncated pyramids and columns.

Here, the lower mirror may include a set of three adjacent divided first low refractive-index layers. Only one hole may be formed at a point for collecting vertexes of three angles of the hexagons that form the set of first low refractive-index layers. The hole is coupled with the first low refractive-index layer through the second high refractive-index layer. The upper mirror may also include a set of three adjacent divided second low refractive-index layers. Only one hole may be formed at a point for collecting vertexes of three angles of the hexagons that form the set of second low refractive-index layers. The hole is coupled with the second low refractive-index layer through the fourth and third high refractive-index layers. This layout can decrease the number of holes connecting with all the first and second low refractive-index layers.

The top-view layout of the hole is preferably formed in the lower mirror so as to deviate from the top-view layout of the hole in the upper mirror. Part of the lower mirror not functioning as a mirror unit can block out and diffuse the light entering from the hole in the upper mirror.

The holes in the lower and upper mirrors can be circular (i.e., of cylindrical column). The radiuses of the holes in the lower and upper mirrors are preferably designed so as to directly reach the hexagonal top surfaces of the first and second low refractive-index layers from the points for collecting vertexes of three angles of three adjacent hexagonal segmented portions without the first and second reinforcing section intervening, respectively. Thus, each hole can sufficiently connect with the first and second low refractive-index layers.

The first through fourth high refractive-index layers and the first and second low refractive-index layers are made of a material featuring a first refractive index and another material featuring a second refractive index smaller than the first refractive index. When the above-mentioned structure uses a high n ratio, i.e., 3.4 or more as a ratio between the first and second refractive indexes, the optical multilayer mirror can provide much higher reflectance. For example, the first through fourth high refractive-index layers can be made of Ge or Si. The first and second low refractive-index layers can be made of air as mentioned above.

Further, as another aspect, a Fabry-Perot interferometer is provided as follows. The Fabry-Perot interferometer includes the optical multilayer mirror having the above-mentioned features. The first and second high refractive-index layers are formed outside a region for the lower mirror. The third and fourth high refractive-index layers are also formed outside a region for the upper mirror to provide a membrane. The Fabry-Perot interferometer further includes: a first electrode for applying a voltage to the second high refractive-index layer provided to the lower mirror; and a second electrode for applying a voltage to the fourth high refractive-index layer provided to the upper mirror. An electrostatic attraction is generated based on potentials at the first and second electrodes and varies an interval between the upper and lower mirrors.

The following is preferable. A wiring section is configured by doping, with impurities, the outside of the part of the second high refractive-index layer functioning as the lower mirror and the region corresponding to the first reinforcing section for the lower mirror. The wiring section is connected with the first electrode. A wiring section is configured by doping, with impurities, the outside of the part of the fourth high refractive-index layer functioning as the upper mirror and the region corresponding to the second reinforcing section for the upper mirror. The wiring section is connected with the second electrode. This is because doped impurities absorb the light. It is preferable to prevent impurities from being introduced into the part functioning as a mirror unit. Though not for the wiring section, impurities can be doped for part of the first high refractive-index layer corresponding to the hole connecting to the first low refractive-index layer. The purpose is to prevent unnecessary light from being transmitted at that part.

A hole may be configured to cross the third and fourth high refractive-index layers extended outside of the upper mirror to thereby communicate with the gap between the lower mirror and the upper mirror. The hole can be used for etching the gap.

It is preferable to form multiple holes in the third and fourth high refractive-index layers outside the upper mirror and ensure the same interval between the adjacent holes. The membrane can be efficiently fabricated because a uniform amount of etching can be conducted. It is preferable to form and arrange holes in the third and fourth high refractive-index layers outside the upper mirror along concentric circles at the same interval around the optical multilayer mirror. In addition to outside the upper mirror, a hole may be formed inside it so as to connect with the second low refractive-index layer. An interval between these holes preferably is equal to that between the holes formed outside the upper mirror.

Further, as another aspect, an optical multilayer mirror having a plurality of mirror units is provided as having at least one mirror. This optical multilayer mirror includes: a first high refractive-index layer that features a first refractive index; a low refractive-index layer that is arranged to face a portion of the first high refractive-index layer and features a second refractive index smaller than the first refractive index, the portion corresponding to the individual mirror units; a second high refractive-index layer that is arranged to cover the low refractive-index layer; and a reinforcing section that is configured to support a portion of the second high refractive-index layer covering a top surface of the low refractive-index layer and reach the first high refractive-index layer via the low refractive-index layer.

Furthermore, as yet another aspect, an optical multilayer mirror is provided as follows. The optical multilayer mirror includes a lower mirror and an upper mirror. The lower mirror is arranged over a substrate, while the upper mirror faces the lower mirror via a gap. The lower mirror comprises: a first high refractive-index layer that is arranged over the substrate and features a first refractive index; a first air layer that is arranged to face the first high refractive-index layer and features a second refractive index smaller than the first refractive index; and a second high refractive-index layer that is arranged to cover the first air layer. The upper mirror comprises: a third high refractive-index layer that is arranged over the substrate and features the first refractive index; a second air layer that is arranged to face the third high refractive-index layer and features the second refractive index; and a fourth high refractive-index layer that is arranged to cover the second air layer.

It will be obvious to those skilled in the art that various changes may be made in the above-described embodiments of the present invention. However, the scope of the present invention should be determined by the following claims.

What is claimed is:

1. An optical multilayer mirror including a lower mirror and an upper mirror, the lower mirror being arranged over a substrate, the upper mirror facing the lower mirror via a gap, the lower mirror comprising:
   a first high refractive-index layer that is arranged over the substrate and features a first refractive index;
   a first low refractive-index layer that is arranged to face the first high refractive-index layer and features a second refractive index smaller than the first refractive index;
   a second high refractive-index layer that is arranged to cover the first low refractive-index layer; and
   a first reinforcing section that is configured to support a portion of the second high refractive-index layer covering a top surface of the first low refractive-index layer and reach the first high refractive-index layer via the first low refractive-index layer,
   the upper mirror comprising:
   a third high refractive-index layer that is arranged over the substrate and features the first refractive index;
   a second low refractive-index layer that is arranged to face the third high refractive-index layer and features the second refractive index;
   a fourth high refractive-index layer that is arranged to cover the second low refractive-index layer; and
   a second reinforcing section that is configured to support a portion of the fourth high refractive-index layer covering a top surface of the second low refractive-index layer and reach the third high refractive-index layer via the second low refractive-index layer,
   wherein the first reinforcing section included in the lower mirror corresponds to a first portion of the second high refractive-index layer, the first portion ranging between a portion opposed to the top surface of the first low refractive-index layer and a portion reaching the first high refractive-index layer by crossing the first low refractive-index layer, and
   wherein the second reinforcing section included in the upper mirror corresponds to a second portion of the fourth high refractive-index layer, the second portion ranging between a portion opposed to the top surface of the second low refractive-index layer and a portion reaching the third high refractive-index layer by crossing the second low refractive-index layer.

2. The optical multilayer mirror of claim 1, wherein the first and second low refractive-index layers are made of one of gas, liquid, vacuum, sol, and gel.

3. The optical multilayer mirror of claim 1, wherein the first and second low refractive-index layers are made of air.

4. The optical multilayer mirror of claim 1, wherein:
   the first low refractive-index layer is divided into a plurality of segmented portions and the first reinforcing section is configured as a portion of the second high refractive-index layer opposed to a side of each of the segmented portions; and
   the second low refractive-index layer is divided into a plurality of segmented portions and the second reinforcing section is configured as a portion of the fourth high refractive-index layer opposed to a side of each of the segmented portions.

5. An optical multilayer mirror including a lower mirror and an upper mirror, the lower mirror being arranged over a substrate, the upper mirror facing the lower mirror via a gap, the lower mirror comprising:
   a first high refractive-index layer that is arranged over the substrate and features a first refractive index;
   a first low refractive-index layer that is arranged to face the first high refractive-index layer and features a second refractive index smaller than the first refractive index;
   a second high refractive-index layer that is arranged to cover the first low refractive-index layer; and
   a first reinforcing section that is configured to support a portion of the second high refractive-index layer covering a top surface of the first low refractive-index layer and reach the first high refractive-index layer via the first low refractive-index layer,
   the upper mirror comprising:
   a third high refractive-index layer that is arranged over the substrate and features the first refractive index;
   a second low refractive-index layer that is arranged to face the third high refractive-index layer and features the second refractive index;
   a fourth high refractive-index layer that is arranged to cover the second low refractive-index layer; and
   a second reinforcing section that is configured to support a portion of the fourth high refractive-index layer covering a top surface of the second low refractive-index layer and reach the third high refractive-index layer via the second low refractive-index layer,
   wherein the first reinforcing section is configured as a first metal layer that crosses the first low refractive-index layer and ranges between the second high refractive-index layer and the first high refractive-index layer; and wherein the second reinforcing section is configured as a second metal layer that crosses the second low refractive-index layer and ranges between the fourth high refractive-index layer and the third high refractive-index layer.

6. The optical multilayer mirror of claim 5, wherein:
the first low refractive-index layer is divided into a plurality of segmented portions and the first metal layer is opposed to a side of each of the segmented portions; and
the second low refractive-index layer is divided into a plurality of segmented portions and the second metal layer is opposed to a side of each of the segmented portions.

7. The optical multilayer mirror of claim 4, wherein:
top-view layouts of the first and second reinforcing sections for the lower and upper mirrors are matched to each other.

8. An optical multilayer mirror including a lower mirror and an upper mirror, the lower mirror being arranged over a substrate, the upper mirror facing the lower mirror via a gap,
the lower mirror comprising:
a first high refractive-index layer that is arranged over the substrate and features a first refractive index;
a first low refractive-index layer that is arranged to face the first high refractive-index layer and features a second refractive index smaller than the first refractive index;
a second high refractive-index layer that is arranged to cover the first low refractive-index layer; and
a first reinforcing section that is configured to support a portion of the second high refractive-index layer covering a top surface of the first low refractive-index layer and reach the first high refractive-index layer via the first low refractive-index layer,
the upper mirror comprising:
a third high refractive-index layer that is arranged over the substrate and features the first refractive index;
a second low refractive-index layer that is arranged to face the third high refractive-index layer and features the second refractive index;
a fourth high refractive-index layer that is arranged to cover the second low refractive-index layer; and
a second reinforcing section that is configured to support a portion of the fourth high refractive-index layer covering a top surface of the second low refractive-index layer and reach the third high refractive-index layer via the second low refractive-index layer,
wherein in the lower mirror, the first low refractive-index layer is divided into segmented portions and a top surface of each of the segmented portions has an identical polygonal shape; and
wherein in the upper mirror, the second low refractive-index layer is divided into segmented portions and a top surface of each of the segmented portions has the identical polygonal shape.

9. The optical multilayer mirror of claim 8, wherein:
each segmented portion of the first and second low refractive-index layers is shaped into a multi-sided truncated pyramid.

10. The optical multilayer mirror of claim 9, wherein:
a portion of the second high refractive-index layer faces and slants against a side of each segmented portion of the first low refractive-index layer at an angle of 45°; and
a portion of the fourth high refractive-index layer faces and slants against a side of each of segmented portion of the second low refractive-index layer at an angle of 45°.

11. The optical multilayer mirror of claim 8, wherein each segmented portion of the first and second low refractive-index layers is shaped into a multi-sided column.

12. The optical multilayer mirror of claim 8, wherein:
top surfaces of the first and second low refractive-index layers are divided into a plurality of hexagonal segmented portions configured as being honeycombed.

13. The optical multilayer mirror of claim 12, wherein:
the lower mirror includes a first hole at a point for collecting vertexes of three angles of a set of three adjacent hexagonal segmented portions of the first low refractive-index layer, the first hole being coupled with the first low refractive-index layer and crossing the second high refractive-index layer; and
the upper mirror includes a second hole at a point for collecting vertexes of three angles of a set of three adjacent hexagonal segmented portions of the second low refractive-index layer, the second hole being coupled with the second low refractive-index layer and crossing the third and fourth high refractive-index layers.

14. The optical multilayer mirror of claim 13, wherein:
top-view layouts of the first and second holes deviate from each other.

15. The optical multilayer mirror of claim 13, wherein:
the first hole in the lower mirrors is circular in a top view, and
a radius of the first hole is designed so as to directly reach the hexagonal top surface of the first low refractive-index layer from the point for collecting vertexes of three angles of three adjacent hexagonal segmented portions without the first reinforcing section intervening; and
the second hole in the upper mirrors is circular in a top view, and
a radius of the second hole is designed so as to directly reach the hexagonal top surface of the second low refractive-index layer from the point for collecting vertexes of three angles of three adjacent hexagonal segmented portions without the second reinforcing section intervening.

16. The optical multilayer mirror of claim 1, wherein:
a ratio of the first refractive index relative to the second refractive index is more than or equal to 3.4.

17. The optical multilayer mirror of claim 1, wherein the first through fourth high refractive-index layers are made of Ge or Si.

18. Fabry-Perot interferometer provided with the optical multilayer mirror of claim 1,
wherein the first and second high refractive-index layers are extended towards an outside of a region for the lower mirror, and
wherein the third and fourth high refractive-index layers are extended towards an outside of a region for the upper mirror to provide a membrane,
the Fabry-Perot interferometer comprising:
a first electrode for applying a voltage to the second high refractive-index layer in the lower mirror; and
a second electrode for applying a voltage to the fourth high refractive-index layer in the upper mirror,
wherein an electrostatic attraction is generated based on potentials at the first and second electrodes to thereby vary an interval between the upper and lower mirrors.

19. The Fabry-Perot interferometer of claim 18, wherein:
a first wiring section is configured by doping, with impurities, portions of the second high refractive-index layer, the portions including (i) a portion outside of a portion functioning as the lower mirror and (ii) a portion corresponding to the first reinforcing section, the first wiring section being connected with the first electrode; and a second wiring section is configured by doping, with impurities, portions of the fourth high refractive-index layer, the portions including (i) a portion outside of a portion functioning as the upper mirror and (ii) a portion corresponding to the second reinforcing section, the second wiring section being connected with the second electrode.

20. The Fabry-Perot interferometer of claim 18, wherein a hole is configured to cross the third and fourth high refractive-index layers extended outside of the upper mirror to thereby communicate with the gap between the lower mirror and the upper mirror.

21. The Fabry-Perot interferometer of claim 18, wherein a plurality of holes are configured to cross the third and fourth high refractive-index layers extended outside of the upper mirror to thereby communicate with the gap between the lower mirror and the upper mirror, wherein identical intervals are provided between adjacent holes.

22. The Fabry-Perot interferometer of claim 18, wherein a plurality of holes are configured to cross the third and fourth high refractive-index layers extended outside of the upper mirror to thereby communicate with the gap between the lower mirror and the upper mirror, wherein the holes are along concentric circles around the optical multilayer mirror, the concentric circles being arranged at identical intervals therebetween.

23. A Fabry-Perot interferometer provided with the optical multilayer mirror of claim 5,
   wherein the first and second high refractive-index layers are extended towards an outside of a region for the lower mirror, and
   wherein the third and fourth high refractive-index layers are extended towards an outside of a region for the upper mirror to provide a membrane,
   the Fabry-Perot interferometer comprising:
   a first electrode for applying a voltage to the second high refractive-index layer in the lower mirror; and
   a second electrode for applying a voltage to the fourth high refractive-index layer in the upper mirror,
   wherein an electrostatic attraction is generated based on potentials at the first and second electrodes to thereby vary an interval between the upper and lower mirrors.

24. A Fabry-Perot interferometer provided with the optical multilayer mirror of claim 8,
   wherein the first and second high refractive-index layers are extended towards an outside of a region for the lower mirror, and
   wherein the third and fourth high refractive-index layers are extended towards an outside of a region for the upper mirror to provide a membrane,
   the Fabry-Perot interferometer comprising:
   a first electrode for applying a voltage to the second high refractive-index layer in the lower mirror; and
   a second electrode for applying a voltage to the fourth high refractive-index layer in the upper mirror,
   wherein an electrostatic attraction is generated based on potentials at the first and second electrodes to thereby vary an interval between the upper and lower mirrors.

* * * * *